United States Patent
Kang et al.

(10) Patent No.: US 9,411,349 B2
(45) Date of Patent: Aug. 9, 2016

(54) OVERCURRENT DETECTION OF LOAD CIRCUITS WITH TEMPERATURE COMPENSATION

(71) Applicant: LITTELFUSE, INC., Chicago, IL (US)

(72) Inventors: Sam S. Kang, Pleasanton, CA (US);
John W. Jorgensen, Reno, NV (US);
Chad N. Marak, Cedar Park, TX (US)

(73) Assignee: LITELFUSE, INC., Chicago, IL (US)

( * ) Notice: Subject to any disclaimer, the term of this patent is extended or adjusted under 35 U.S.C. 154(b) by 83 days.

(21) Appl. No.: 14/540,078

(22) Filed: Nov. 13, 2014

(65) Prior Publication Data

US 2015/0130438 A1    May 14, 2015

Related U.S. Application Data

(60) Provisional application No. 61/904,135, filed on Nov. 14, 2013.

(51) Int. Cl.
*G05F 1/573* (2006.01)
*H02H 9/02* (2006.01)

(52) U.S. Cl.
CPC .............. *G05F 1/573* (2013.01); *H02H 9/025* (2013.01)

(58) Field of Classification Search
CPC .................. G05F 1/573; H02M 2001/327
See application file for complete search history.

(56) References Cited

U.S. PATENT DOCUMENTS

| | | | | | |
|---|---|---|---|---|---|
| 3,900,719 | A * | 8/1975 | Yamauchi | ................. | G06J 1/00 708/7 |
| 5,568,347 | A * | 10/1996 | Shirai | ................. | H03K 17/0822 361/103 |
| 5,796,244 | A * | 8/1998 | Chen | ................. | G05F 3/30 323/313 |
| 5,892,647 | A * | 4/1999 | Mizoe | ................. | G05F 1/573 361/101 |
| 6,330,173 | B1 * | 12/2001 | Yamasaki | ................. | G05F 1/465 327/540 |
| 6,356,141 | B1 * | 3/2002 | Yamauchi | ................. | G05F 3/262 323/312 |
| 7,622,902 | B1 * | 11/2009 | Kao | ................. | G05F 1/575 323/276 |
| 7,659,706 | B2 * | 2/2010 | Nishida | ................. | H02H 3/087 323/314 |
| 7,737,675 | B2 * | 6/2010 | Murase | ................. | G05F 3/30 323/313 |
| 2001/0011921 | A1 * | 8/2001 | Ooishi | ................. | G05F 1/465 327/540 |
| 2002/0030475 | A1 * | 3/2002 | D'Angelo | ................. | G05F 3/242 323/316 |
| 2003/0197532 | A1 * | 10/2003 | Tsuchida | ............ | H03K 17/0822 327/108 |
| 2004/0100234 | A1 * | 5/2004 | Okubo | ................. | G05F 1/569 323/276 |

(Continued)

OTHER PUBLICATIONS

International Search Report and Written Opinion from corresponding PCT/US2014/065619 mailed Feb. 20, 2015.

*Primary Examiner* — Timothy J Dole
*Assistant Examiner* — Yusef Ahmed

(57) ABSTRACT

An improved current limiting circuit including a switch having a first terminal and a second terminal, the first and second terminal configured to connect a power supply to a load. A first resistor connected in series between the first terminal and a first constant current source. A second resistor connected in series between the second terminal and a second constant current source. A control circuit configured to measure a voltage drop across the first resistor and compare the voltage drop to a voltage drop across the switch.

19 Claims, 7 Drawing Sheets

(56) References Cited

U.S. PATENT DOCUMENTS

| | | | |
|---|---|---|---|
| 2004/0207967 A1* | 10/2004 | Ohshima | H03K 17/0822 361/93.1 |
| 2005/0094340 A1* | 5/2005 | Dai | H02H 9/004 361/93.1 |
| 2005/0275394 A1* | 12/2005 | Moraveji | G05F 1/565 323/312 |
| 2008/0185975 A1* | 8/2008 | Chen | H05B 33/0827 315/291 |
| 2009/0121653 A1* | 5/2009 | Chida | G05F 1/563 315/307 |
| 2009/0225478 A1* | 9/2009 | Kido | G05F 1/573 361/18 |
| 2010/0289462 A1* | 11/2010 | Wu | H03F 1/30 323/234 |
| 2011/0012582 A1* | 1/2011 | Aisu | G05F 1/575 323/314 |
| 2011/0096578 A1* | 4/2011 | Fang | H02M 3/33592 363/127 |
| 2013/0278236 A1* | 10/2013 | Nakahara | G05F 1/10 323/282 |
| 2013/0279057 A1* | 10/2013 | Terrill | H02H 9/025 361/93.9 |
| 2014/0157011 A1* | 6/2014 | Tseng | G05F 3/24 713/300 |

* cited by examiner

OVERCURRENT DETECTION OF LOAD CIRCUITS WITH TEMPERATURE COMPENSATION

CROSS-REFERENCE TO RELATED APPLICATION

This application claims the benefit of U.S. provisional patent application Ser. No. 61/904,135, filed Nov. 14, 2013, titled "Overcurrent Detection of Load Circuits with Temperature Compensation," the entirety of which application is incorporated by reference herein.

FIELD OF THE DISCLOSURE

This disclosure relates generally to the field of circuit protection devices and more particularly to overcurrent detection circuits.

BACKGROUND OF THE DISCLOSURE

In a powered switch circuit, a load (e.g., lamp, motor, circuit component, computer, or the like) is connected to a power source through a switch. When a short circuit or current surge occurs on the load, or the switch is powered into a short circuit or heavy load, an excessive current may flow through the switch. This is referred to as an overcurrent condition. These overcurrent conditions can present as voltage spikes with durations ranging from a few microseconds to hundreds of milliseconds. Overcurrent conditions can damage the switch, damage the power source, cause a voltage transient, or result in damage or malfunction to other connected circuitry. Overcurrent conditions can be caused by a number of factors, such as, for example, inserting or removing loads under operating conditions (sometimes referred to as "hot swapping"). Overcurrent protection circuits may be used to shut off a switch and protect against overcurrent conditions.

Various kinds of overcurrent protection methods have been proposed. For example, FIG. 1 illustrates an overcurrent protection apparatus 100. The overcurrent protection apparatus 100 includes a switch 110 having a MOSFET transistor 112 and a Diode 114. Apparatus 100 also includes terminals 122 and 124 for connecting a source (not shown) to a load (not shown). Furthermore, a control circuit 130 comprised of an operational amplifier is configured to open and close the switch 110. As depicted, the inputs to the control circuit 130 are connected to the terminals 122 and 124 (or the source and the drain of the MOSFET transistor 112.) Therefore, the control circuit 130 is configured to measure the voltage drop between the drain and the source of the MOSFET transistor 112 and compare this voltage drop to a built in voltage differential. The output of the control circuit 130 is connected to the gate of the MOSFET transistor 112 and shuts off the MOSFET transistor 112 (thereby closing the switch 110) if an overcurrent is detected as measured by the voltage drop.

FIG. 2 illustrates another overcurrent protection apparatus 200. Apparatus 200 includes a switch 210 having a MOSFET transistor 212 and a Diode 214. Apparatus 200 also includes terminals 222 and 224 for connecting a source (not shown) to a load (not shown). Furthermore, a control circuit 230 comprised of an operational amplifier is configured to open and close the switch 210. Apparatus 200 also includes a first resistor 242 (R1) connected in series between terminal 224 and the switch 210. A second resistor 244 (R2) connected in series between the terminal 224 and a constant current source 252. The inputs to the operational amplifier are connected across the first and second resistors 242, 244. As such, the control circuit 230 is configured to compare the voltage drop across the first resistor 242 to the voltage drop across the second resistor 244 and turn the switch 210 on or off accordingly.

The current limiters apparatuses described in FIGS. 1-2 have various disadvantages. For example, apparatus 100 and apparatus 200 merely check for an overload threshold condition and shuts the switch off once such a condition occurs. Furthermore, FIG. 2 adds a resistor in series between the source and the load, thereby adding an extra voltage drop into the current path.

FIG. 3 illustrates another overcurrent protection apparatus 300. Apparatus 300 is described in greater detail in U.S. Pat. No. 6,917,503 entitled "Programmable current limiting using a shunt resistor," which reference is incorporated entirely herein by reference. Apparatus 300 includes a switch 310 having a MOSFET transistor 312 and a Diode 314. Apparatus 300 also includes terminals 322 and 324 for connecting a source (not shown) to a load (not shown). Furthermore, a control circuit 330 comprised of an operational amplifier is configured to open and close the switch 310. Apparatus 300 also includes a first resistor 342 (R1) connected in series between the terminal 324 and a constant current source 350. The inputs to the operational amplifier are connected between the first resistor 342 and the current source 350 and at the terminal 322. Accordingly, the control circuit 330 is configured to compare the voltage drop across the first resistor 342 to the voltage drop across the MOSFET transistor 312 and turn the switch 310 on and off accordingly.

Apparatus 300 seeks to compensate for temperature fluctuations. More specifically, the on-resistance of the MOSFET transistor 312 is proportional to the absolute temperature. The current source 350 can be made to behave similar to the on-resistance of the MOSFET transistor 312, that is, proportionally to the absolute temperature. These two temperature coefficients compensate each other. However, as will be appreciated, the first resistor 342 is also temperature dependent, which affects the temperature dependent balance between the MOSFET transistor 312 and the current source 350. As such, the voltage drop of the first resistor 342 is not proportional to the absolute temperature.

Another disadvantage to apparatus 200 and apparatus 300 shown above is the current source (e.g., 252 or 350) is dependent on the power supply. As will be appreciated, most current sources are constant when the connected power supply is constant. However, when the voltage level of the power supply increases, the current level of the current source also increased. This can affect the ability of the control circuits to measure the voltage drops. Especially when the power supply has a large swing or when the on-resistance of the MOSFET is very small.

Thus, there is a need for a current limiter that provides temperature compensation. Also there is a need for a current limiter that is not affected by voltage swings of the power supply.

SUMMARY

Various embodiments are directed to a current limiting circuit. The current limiting circuit may include a switch having a first terminal and a second terminal, the first and second terminals configured to connect a power supply to a load, a first resistor connected in series between the first terminal and a first constant current source, a second resistor connected in series between the second terminal and a second constant current source, and a control circuit configured to measure a voltage drop across the first resistor and compare the voltage drop to a voltage drop across the switch.

Various embodiments are directed to current limiting circuit for a MOS transistor switch for overcurrent detection with temperature compensation. The current limiting circuit may include a switch having a first terminal and a second terminal, the first and second terminal configured to connect a power supply to a load. A first resistor, having a first resistor value, connected in series between the first terminal and a first constant current source having a first constant current source value. A second resistor, having a second resistor value, connected in series between the second terminal and a second constant current source having a second constant current source value; wherein the first resistor value, the second resistor value, the first constant current source value, and the second constant current source are such that a first temperature coefficient for the first resistor cancel out a second temperature coefficient for the second resistor. A control circuit configured to measure a voltage drop across the first resistor and compare the voltage drop of the first constant current source to a voltage drop across the switch.

Various embodiments are directed to a system for overcurrent detection of load circuits with temperature compensation. The system may include a power supply and a load connected to the power supply. A switch having a first terminal and a second terminal, the first and second terminal configured to connect the power supply to the load. A first resistor, having a first resistor value, connected in series between the first terminal and a first constant current source having a first constant current source value. A second resistor, having a second resistor value, connected in series between the second terminal and a second constant current source having a second constant current source value. The first resistor value, the second resistor value, the first constant current source value, and the second constant current source are such that a first temperature coefficient for the first resistor cancel out a second temperature coefficient for the second resistor. A control circuit configured to measure a voltage drop across the first resistor and compare the voltage drop of the first constant current source to a voltage drop across the switch, wherein the voltage drop across the first resistor is constant with changes to the power supply.

Various embodiments are directed to a method of operation in a current limiting circuit. The current limiting circuit comprising a switch having a first terminal and a second terminal, the first and second terminal configured to connect a power supply to a load. A first resistor, having a first resistor value, connected in series between the first terminal and a first constant current source having a first constant current source value. A second resistor, having a second resistor value, connected in series between the second terminal and a second constant current source having a second constant current source value. A control circuit having an operational amplifier, the operational amplifier having a first input connected between the first resistor and the first constant current source and a second input connected between the second resistor and the second constant current source. The method may comprise selecting the first resistor value and the second resistor value such that a first temperature coefficient for the first resistor cancels out a second temperature coefficient for the second resistor, measuring a voltage drop across the first resistor by the control circuit, and comparing the voltage drop of the first constant current source to a voltage drop across the switch by the control circuit.

BRIEF DESCRIPTION OF THE DRAWINGS

By way of example, specific embodiments of the disclosed device will now be described, with reference to the accompanying drawings, in which.

DETAILED DESCRIPTION

Figure 4:
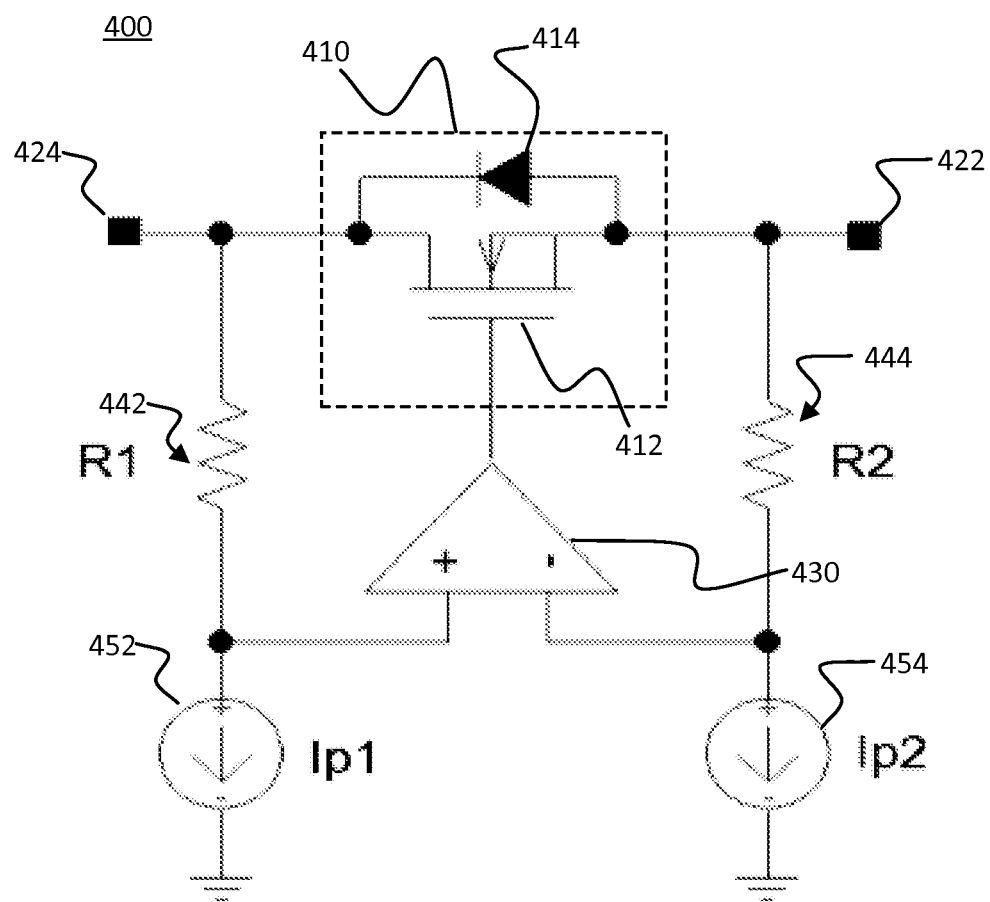
FIG. 4 is a block diagram of a current limiting apparatus according to at least one embodiment of the present disclosure.

FIG. 4 illustrates a current limiting apparatus 400, arranged according to at least one embodiment of the present disclosure. The apparatus 400 may provide for overcurrent detection with temperature compensation and is not affected by voltage swings of a power supply. Apparatus 400 includes a switch 410 having a MOSFET transistor 412 and a Diode 414. Apparatus 400 also includes terminals 422 and 424 for connecting a source (not shown) to a load (not shown). Furthermore, a control circuit 430 comprised of an operational amplifier is configured to open and close the switch 410. The switch 410 may be a P-channel field-effect transistor FET transistor or may be an N-channel FET transistor. Apparatus 400 also includes a first resistor 442 (R1) connected in series between the terminal 424 and a first constant current source 452 (Ip1). Apparatus 400 also includes a second resistor 444 (R2) connected in series between the terminal 422 and a second constant current source 454 (Ip2).

The inputs to the operational amplifier are connected between the first resistor 442 and the first constant current source 452 and the second resistor 444 and the second constant current source 454. Accordingly, the control circuit 430 is configured to compare the voltage drop across the first resistor 442 to the voltage drop across the MOSFET transistor 412 and turn the switch 410 on and off accordingly. The values of the first and second resistors 442, 444 as well as the first and second constant current source may be selected such that the temperature coefficient of the first and second resistors 442, 444 may cancel each other out. In other words, the values of the first resistor and the second resistor and the values of the first constant current source and the second constant current source are selected such that a first temperature coefficient for the first resistor cancel out a second temperature coefficient for the second resistor. As such, only the voltage drop with first constant current source 452 is compared to the voltage drop of the MOSFET transistor 412.

Figure 1:
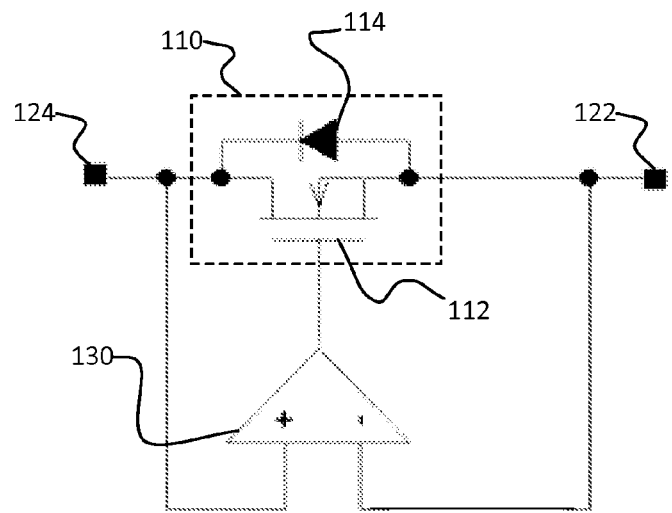
FIGS. 1-3 are block diagrams of prior art current limiting apparatuses.
Figure 2:
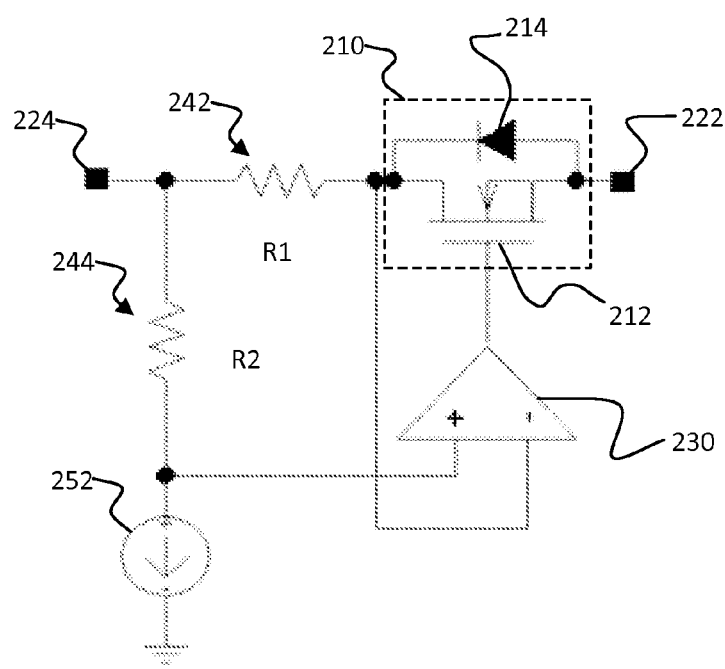
Figure 3:
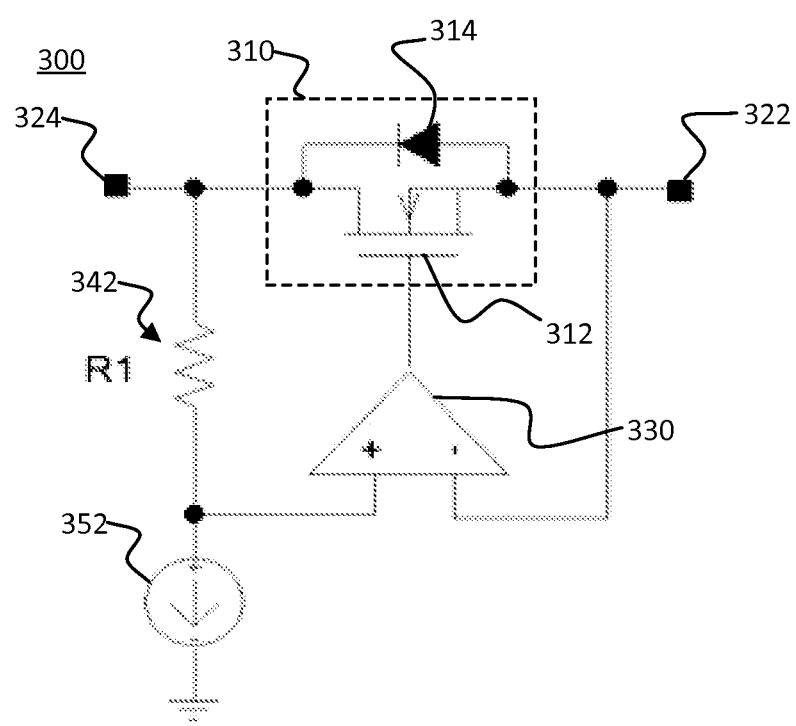

Apparatus 400 provides advantages over prior current limiters. For example, the dependence of the first constant current source 452 on to power supply is diminished. More specifically, referring to prior designs (e.g., apparatus 300 of FIG. 3,) if the power supply is increased or decreased, the constant current source (e.g., 352) also changes. However, in apparatus 400, both the first and second constant current source 452, 454 increase as the power supply is increased. However, as both current sources increase, the increment due to the power supply change may be cancelled out. More specifically, the voltage drop across the first resistor 442 minus the voltage drop across the second resistor 444, which is compared to the voltage drop of the MOSFET transistor 412, is constant with changes in the power supply. Thus, a current limiting circuit that has reduced dependence on temperature and power supply effects is provided. As such, the voltage drop across a resistor (e.g., the first resistor 442) may be measured more accurately, even with variations in temperature and power supply levels.

Figure 5:
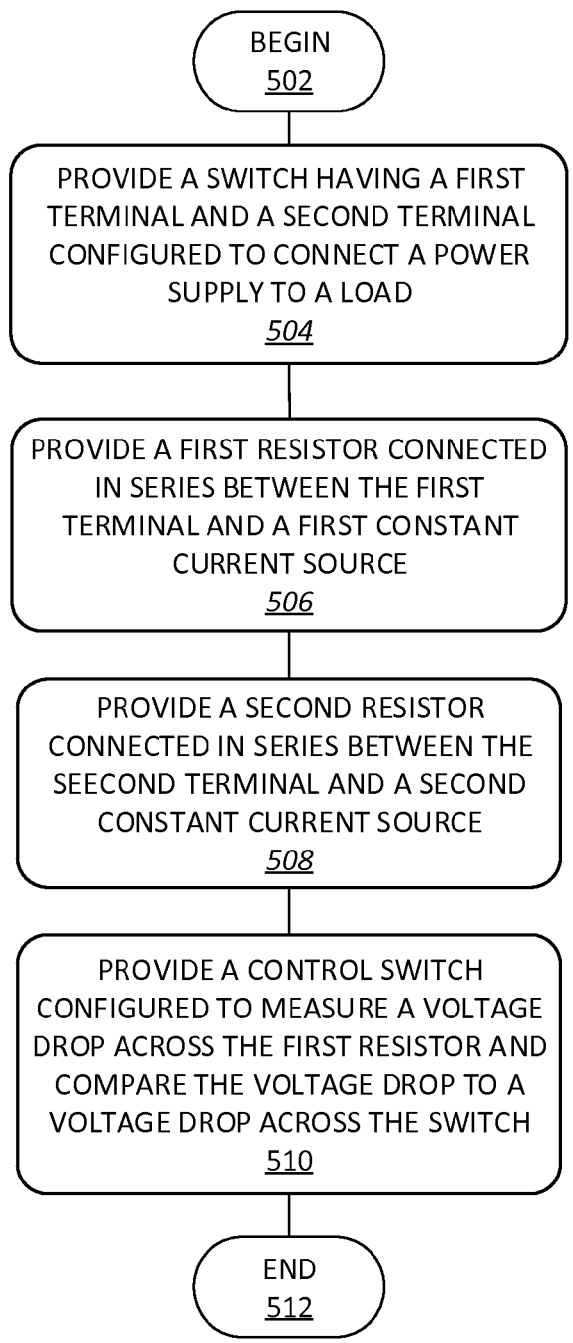
FIG. 5 is a logic flow diagram of a method of manufacturing the current limiting apparatus of FIG. 4.

FIG. 5 is a logic flow diagram of a method 500 of manufacturing the current limiting apparatus according to at least one embodiment of the present disclosure. In general, the method 500 is described with reference to FIG. 4. It is to be appreciated, that the method 500 may also be used to manufacture the apparatus 400 described or other current limiting apparatus consistent with the present disclosure. The method 500 may begin at block 502. At block 504, a method of manufacturing provides a switch having a first terminal and a second terminal and the first terminal and the second terminal configured to connect a power supply to a load. The method of manufacturing provides a first resistor, having a first resistor value, connected in series between the first terminal and a first constant current source having a first constant current source value at block 506. The method of manufacturing provides a second resistor, having a second resistor value that is selected, connected in series between the second terminal and a second constant current source having a second constant current source value at block 508. The first resistor value, the second resistor value, the first constant current source value, and the second constant current source are such that a first temperature coefficient for the first resistor cancel out a second temperature coefficient for the second resistor. The method of manufacturing provides a control circuit configured to measure a voltage drop across the first resistor and compare the voltage drop of the first constant current source to a voltage drop across the switch at block 510. The method of manufacturing may end at block 512.

Figure 6:
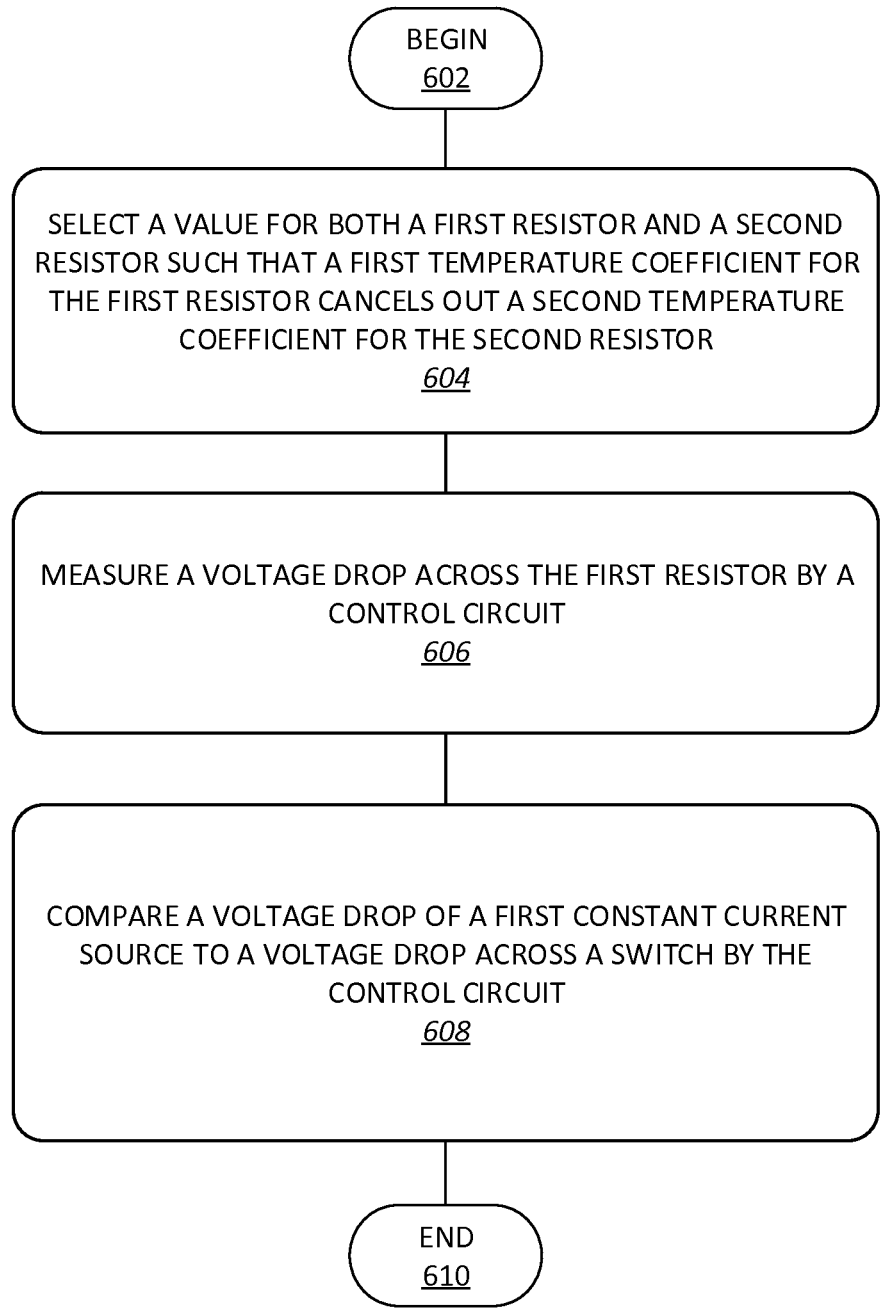
FIG. 6 is a logic flow diagram of a method of operating the current limiting apparatus of FIG. 4.

FIG. 6 is a logic flow diagram of a method 600 of operating the current limiting apparatus according to at least one embodiment of the present disclosure. In general, the method 600 is described with reference to FIG. 4. It is to be appreciated, that the method 600 may also be used to manufacture the apparatus 400 described or other current limiting apparatus consistent with the present disclosure. The method 600 may begin at block 602. At block 604, a method selects the first resistor value and the second resistor value such that a first temperature coefficient for the first resistor cancels out a second temperature coefficient for the second resistor at block 604. At block 606, the control circuit measures a voltage drop across the first resistor. The voltage drop of the first constant current source is compared to a voltage drop across the switch by the control circuit at block 608. The method 600 ends at block 610.

Figure 7:
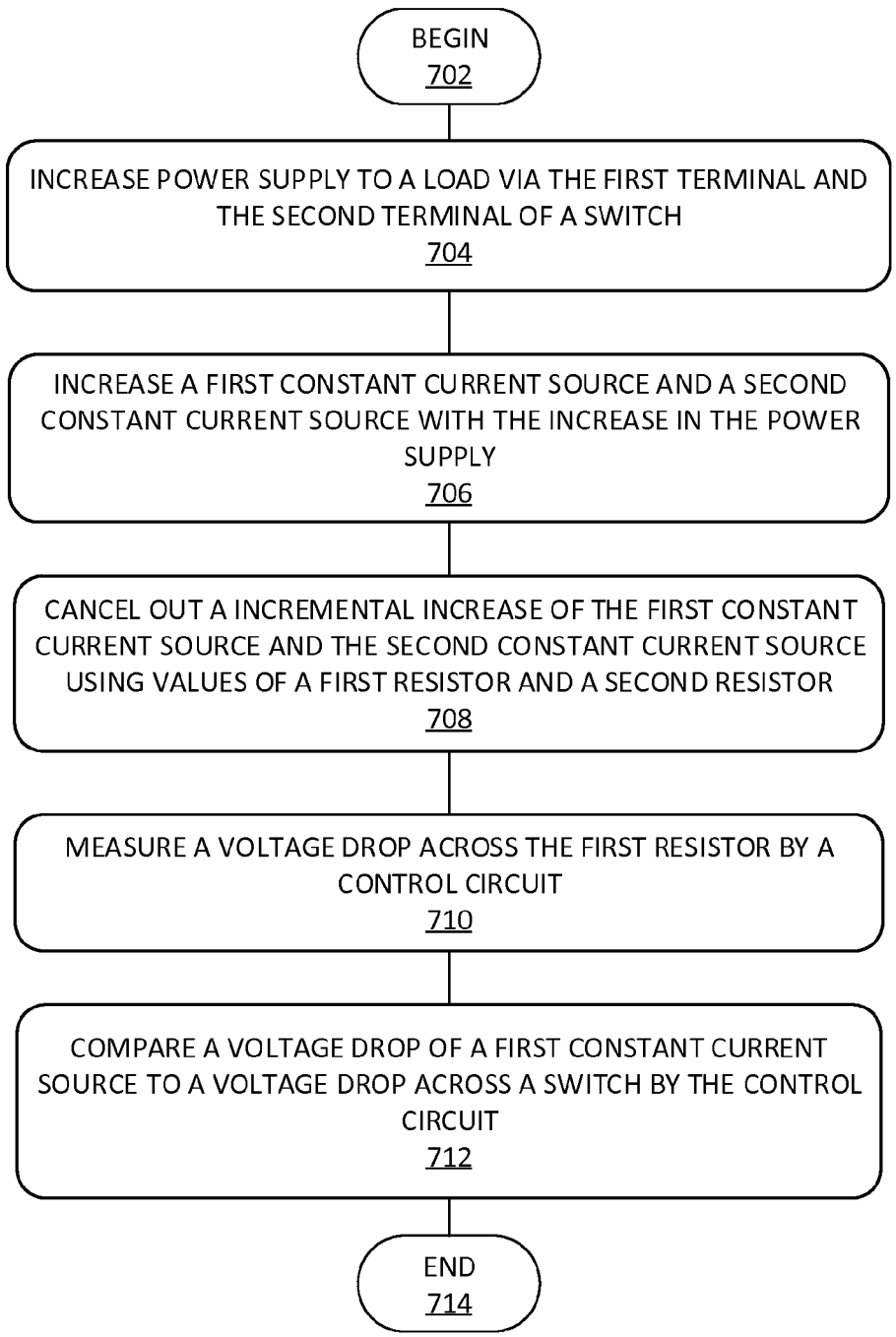
FIG. 7 is an additional logic flow diagram of a method of operating the current limiting apparatus of FIG. 4.

FIG. 7 is an additional logic flow diagram of a method 700 of operating the current limiting apparatus according to at least one embodiment of the present disclosure. In general, the method 700 is described with reference to FIG. 4. It is to be appreciated, that the method 700 may also be used to manufacture the apparatus 400 described or other current limiting apparatus consistent with the present disclosure. The method 700 may begin at block 702. A power supply to a load is increased via terminal 424 and terminal 422 of a switch 410 having a MOSFET transistor 412 and a Diode 414 at block 704. The first constant current source 452 and the second constant current source 454 increases as the power supply to the load increases at block 706. The incremental current sources increases in the first constant current source 452 and the second constant current source 454 are canceled out by the first resistor 442 and the second resistor 444 having values selected such that the temperature coefficient of the first resistor 442 and the second resistor 444 may cancel each other out at block 708. The control circuit 430 measures the voltage drop across the first resistor 442 at block 710. The voltage drop of the first constant current source 452 is compared to the voltage drop of the switch 410 (e.g., the MOSFET transistor 412) at block 712. The method 700 of operating may end at 714.

Figure 8:
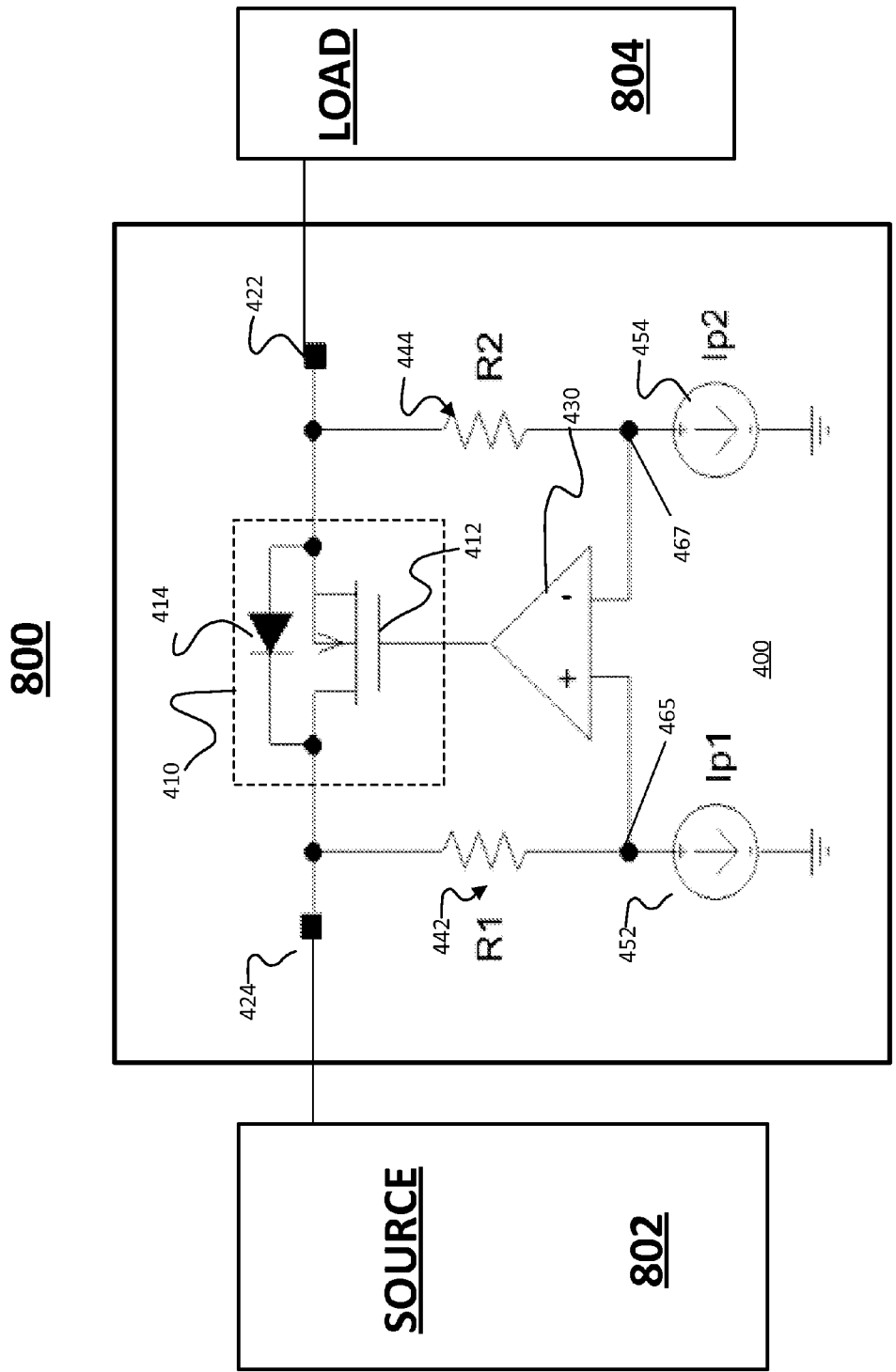
FIG. 8 is a block diagram of a power source connected to a load using the current limiting apparatus of FIG. 4.

FIG. 8 illustrates a system 800 having the current limiting apparatus 400, arranged according to at least one embodiment of the present disclosure. The apparatus 400 may provide for overcurrent detection with temperature compensation and is not affected by voltage swings of a power supply. Apparatus 400 includes a switch 410 having a MOSFET transistor 412 and a Diode 414. The switch 410 may be a P-channel field-effect transistor FET transistor or may be an N-channel FET transistor. Furthermore, a control circuit 430 comprised of an operational amplifier is configured to open and close the switch 410. Apparatus 400 also includes terminals 422 and 424 for connecting a power source 802 to a load 804. Apparatus 400 also includes a first resistor 442 (R1), having a first resistor value, connected in series between the terminal 424 and a first constant current source 452 (Ip1) having a first current source value. Apparatus 400 also includes a second resistor 444 (R2), having a second resistor value, connected in series between the terminal 422 and a second constant current source 454 (Ip2), a second current source value.

The inputs 465, 467 to the operational amplifier are connected between the first resistor 442 and the first constant current source 452 and the second resistor 444 and the second constant current source 454. More specifically, a positive input 465 of the control circuit 430 is connected between the first resistor 442 and the first constant current source 452. The negative input 467 of the control circuit 430 is connected between the second resistor 444 and the second constant current source 454. Accordingly, the control circuit 430 is configured to compare the voltage drop across the first resistor 442 to the voltage drop across the MOSFET transistor 412 and turn the switch 410 on and off accordingly. The values of the first and second resistors 442, 444 as well as the first and second current source may be selected such that the temperature coefficient of the first and second resistors 442, 444 may cancel each other out. As such, only the voltage drop with first constant current source 452 is compared to the voltage drop of the MOSFET transistor 412.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are in the tended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below should be construed in view of the full breadth and spirit of the present disclosure as described herein.

The invention claimed is:

1. A current limiting circuit comprising:
a switch having a first terminal and a second terminal, the first and second terminal configured to connect a power supply to a load;
a first resistor connected in series between the first terminal and a first constant current source;
a second resistor connected in series between the second terminal and a second constant current source; and
a control circuit configured to compare a voltage between the first resistor and the first constant current source to a voltage between the second resistor and the second constant current source;
wherein the first constant current source and the second constant current source increase as the power supply increases, wherein an incremental increase of the first constant current source cancels out an incremental increase of the second constant current source.

2. The current limiting circuit of claim 1, wherein the control circuit includes an operational amplifier configured to turn the switch on and off.

3. The current limiting circuit of claim 2, comprising a first input to the operational amplifier connected between the first resistor and the first constant current source.

4. The current limiting circuit of claim 3, comprising a second input to the operational amplifier connected between the second resistor and the second constant current source.

5. The current limiting circuit of claim 1, wherein:
the first resistor and the second resistor are configured for selecting values of the first resistor and the second resistor, and
the first constant current source and the second constant current source are configured for selecting values of the first constant current source and the second constant current source, wherein:
the values of the first resistor and the second resistor and the values of the first constant current source and the second constant current source are selected such that a first temperature coefficient for the first resistor cancel out a second temperature coefficient for the second resistor.

6. The current limiting circuit of claim 1, wherein the control circuit configured to compare the voltage drop of the first constant current source to a voltage drop across the switch.

7. The current limiting circuit of claim 1, wherein the switch is a P-channel field-effect transistor (FET) transistor.

8. The current limiting circuit of claim 1, wherein the switch is an N-channel field-effect transistor (FET) transistor.

9. A current limiting circuit for a MOS transistor switch for overcurrent detection with temperature compensation comprising:
a switch having a first terminal and a second terminal, the first and second terminal configured to connect a power supply to a load;
a first resistor, having a first resistor value, connected in series between the first terminal and a first constant current source having a first constant current source value;
a second resistor, having a second resistor value, connected in series between the second terminal and a second constant current source having a second constant current source value; wherein the first resistor value, the second resistor value, the first constant current source value, and the second constant current source are such that a first temperature coefficient for the first resistor cancel out a second temperature coefficient for the second resistor, and a control circuit configured to compare a voltage between the first resistor and the first constant current source to a voltage between the second resistor and the second constant current source.

10. The current limiting circuit of claim 9, wherein the control circuit includes an operational amplifier configured to turn the switch on and off.

11. The current limiting circuit of claim 10, comprising a first input to the operational amplifier connected between the first resistor and the first constant current source.

12. The current limiting circuit of claim 10, comprising a second input to the operational amplifier connected between the second resistor and the second constant current source.

13. The current limiting circuit of claim 9, wherein the switch is either a P-channel field-effect transistor (FET) transistor or an N-channel FET transistor.

14. The current limiting circuit of claim 9, wherein the first constant current source and the second constant current source increase as the power supply increases, wherein an incremental increase of the first constant current source cancels out an incremental increase of the second constant current source as the power supply increases.

15. A system comprising:
a power supply;
a load connected to the power supply;
a switch having a first terminal and a second terminal, the first and second terminal configured to connect the power supply to the load;
a first resistor, having a first resistor value, connected in series between the first terminal and a first constant current source having a first constant current source value;
a second resistor, having a second resistor value, connected in series between the second terminal and a second constant current source having a second constant current source value;
wherein the first resistor value, the second resistor value, the first constant current source value, and the second constant current source are such that a first temperature coefficient for the first resistor cancel out a second temperature coefficient for the second resistor, and a control circuit configured to compare a voltage between the first resistor and the first constant current source to a voltage between the second resistor and the second constant current source, wherein the voltage drop across the first resistor is constant with changes to the power supply.

16. The system of claim 15, wherein the control circuit includes:
an operational amplifier configured to turn the switch on and off,
a first input to the operational amplifier connected between the first resistor and the first constant current source, and
a second input to the operational amplifier connected between the second resistor and the second constant current source.

17. The system of claim 15, wherein the switch is a P-channel field-effect transistor (FET) transistor.

18. The system of claim 15, wherein the switch is an N-channel field-effect transistor (FET) transistor.

19. A method of operation in a current limiting circuit, the current limiting circuit comprising:
a switch having a first terminal and a second terminal, the first and second terminal configured to connect a power supply to a load;
a first resistor, having a first resistor value, connected in series between the first terminal and a first constant current source having a first constant current source value;

a second resistor, having a second resistor value, connected in series between the second terminal and a second constant current source having a second constant current source value; and a control circuit having an operational amplifier, the operational amplifier having a first input connected between the first resistor and the first constant current source and a second input connected between the second resistor and the second constant current source, the method comprising:

selecting the first resistor value and the second resistor value such that a first temperature coefficient for the first resistor cancels out a second temperature coefficient for the second resistor, comparing a voltage between the first resistor and the first constant current source to a voltage between the second resistor and the second constant current source by the control circuit.

* * * * *